May 22, 1928.  
F. F. SCHRODER  
INDICATING MECHANISM  
Filed April 27, 1927
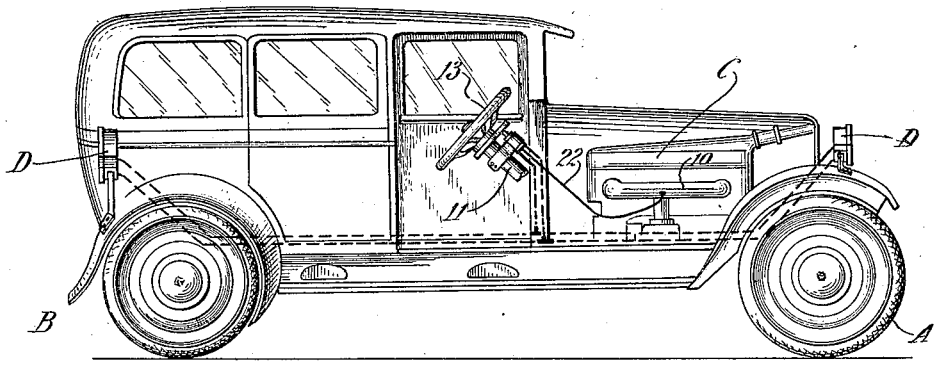
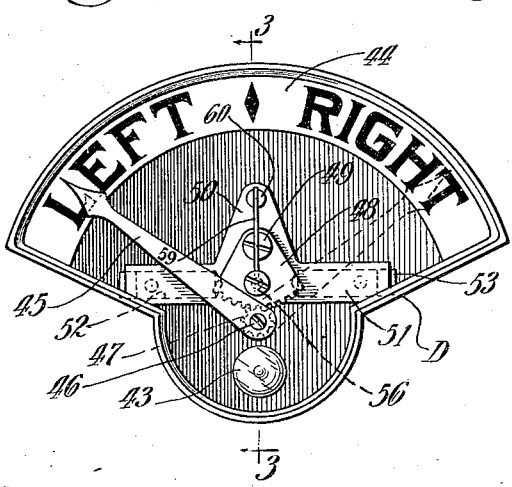
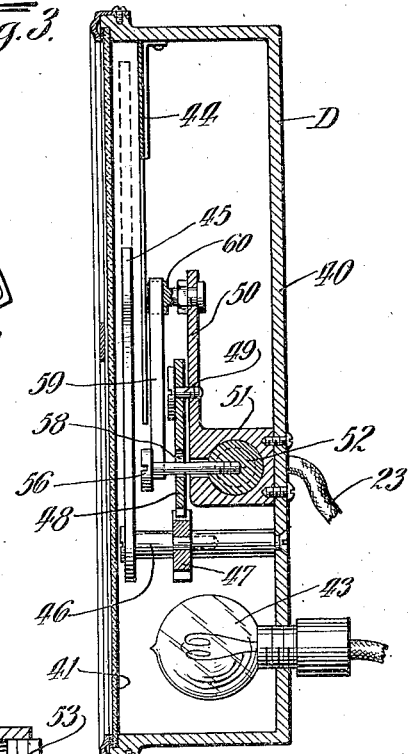
Inventor:  
Fred F. Schroder Inventor:
Fred F. Schroder, Patented May 22, 1928.

1,670,744

UNITED STATES PATENT OFFICE.

FRED F. SCHRODER, OF CHICAGO, ILLINOIS.

INDICATING MECHANISM.

Application filed April 27, 1927. Serial No. 186,857.

This invention relates to an indicating mechanism of a kind which is particularly adapted for use on automobiles to furnish notice concerning steering movements under way. In this mechanism may be comprised one or more indicators located at desired places upon the vehicle, and operated by a common control having connection with the steering apparatus.

It is an object of this invention to provide in a mechanism of the kind specified a sensitive indicating means which is instantly responsive to steering movements in either direction; to operate the indicating means by power derived from the vehicle motor, preferably by minus pressure or vacuum, such as is created in the intake manifold thereof; and to accomplish these ends by means which are simple, inexpensive, easily installed, and durable to withstand hard usage over a prolonged period. My invention contemplates also various other objects which will hereinafter appear.

A suggestive exemplification of this invention is set forth in the accompanying drawings in the manner following:

Figure 1 which is a side elevation of a conventional automobile shows in diagrammatic form the interconnected components of the present invention;

Fig. 2 is a face view of the indicator per se with the cover therefor removed;

Fig. 3 is an enlarged vertical section through the indicator on line 3—3 of Fig. 2;

Fig. 4 is an enlarged detail, partly in section and partly in elevation, showing the cylinder mechanism comprised in the indicator;

The indicating mechanism herein illustrated is designed particularly for an automobile, although it may possibly be used to advantage in other capacities. The description to follow will accordingly refer to the mechanism in association with an automobile, with the understanding, however, that it need not of necessity be so employed.

Figure 5:
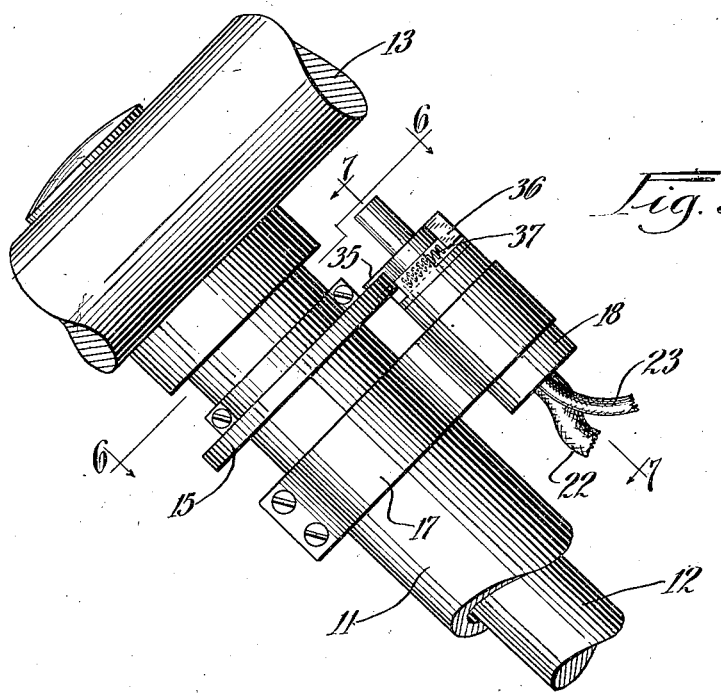
Fig. 5 is a fragmentary view in side elevation of the upper end of the steering post to which is attached the control means for the indicator.

Figure 1 shows a conventional automobile having front and rear wheels A and B respectively, the former dirigible as is customary, and the latter propelled by an internal combustion engine C having an intake manifold 10. The front wheels are controlled by a steering apparatus which includes a column 11 through which is extended a post 12 (see Fig. 5) having at its upper end the usual hand wheel 13.

Mounted fast upon the post, preferably close to the steering wheel, is a collar 15 having a notch 16 at one point in its periphery. This collar, if desired, may be split to facilitate attachment, as suggested in Fig. 6, although this is a detail of minor importance. In proximity to the collar, I have shown a bracket 17 which carries a valve body 18 having three aligned ports 19, 20 and 21 which open at one end thereof. Connected with the central port 20 is a conduit 22 which leads to the intake manifold 10 of the motor. The remaining two conduits 23 and 24 are connected, respectively, with the ports 19 and 21 and lead to opposite ends of the cylinder mechanism contained within the indicator D, a description whereof will presently be furnished.

Figure 8:
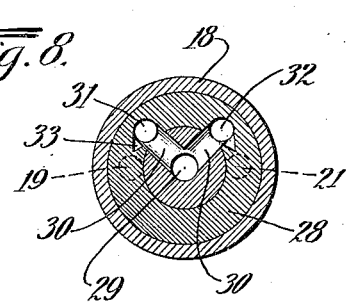
Fig. 8 is a transverse section therethrough taken on line 8—8 of Fig. 7.

The three valve ports terminate upon a face forming one end of a valve chamber having a closure 26 therefor. Through an aperture in the closure I have extended a valve stem 27 which carries at one end a head 28 having a central depending tube 29 disposed within the port 20. Lateral passages 30 provide communication from this central tube to side ports 31 and 32 adapted to register, respectively, with the valve body ports 19 and 21. It is to be noted, however, that these last two ports 31 and 32 are misaligned with respect to the central port 20 so that communication through only one lateral passage 30 can be established at one time. A very slight oscillation of the valve stem will move the head sufficiently to open up communication with one or the other of the body ports 19 and 21, the tube 29 being at all times in open communication with the central port 20. By the provision of small tapering slots 32 proceeding from the ports 31 and 32 toward the associated ports 19 and 21 a very slight communication therewith is established almost immediately following any movement of the valve stem from a normal central position such as is indicated in Fig. 8. It may be found desirable to interpose a compression spring 34 between the closure 26 and the valve head 28 so as to maintain the latter firmly against its seat, and to impose a desired friction or drag to the movements of the valve parts.

Figure 6:
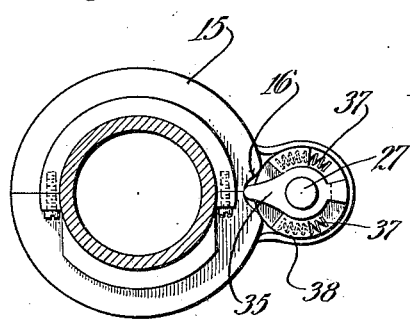
Fig. 6 is a transverse section therethrough taken on line 6—6 of Fig. 5.
Figure 7:
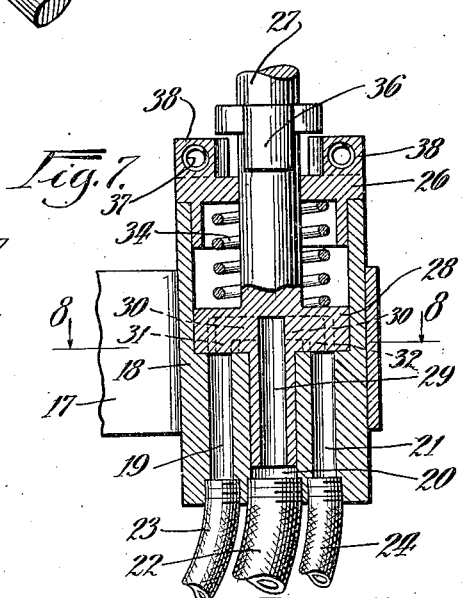
Fig. 7 is an enlarged longitudinal section through the controlling valve taken on line 7—7 of Fig. 5.

Carried by the stem 27 is a finger 35 which extends into the notch 46 so as to be moved in response to oscillations thereof. The opposite finger end is provided with a depending lug 36 adapted to swing idly between a pair of compression springs 37 each socketed within a boss 38 which upstands from the closure 26, the two bosses being on opposite sides of the stem 27, as shown. This arrangement provides, in effect a Geneva movement, the finger being swung and held laterally with each movement of the steering post, and then returned to its normal medial position, as shown in Fig. 6, when the steering post is again brought to the normal straight-ahead position. In the restoration of the finger to this central position, one of the two springs 37 engages initially with the lug 36 so as to assist in pointing the finger toward the notch 16 wherein it is designed to enter.

The mechanism thus far described provides for actuation of one or more indicators D which may be carried at convenient points upon the vehicle. These indicators are in all respects identical and make use of the single control means already described.

Referring now to Figs. 2, 3, and 4, I have shown a housing 40 open on one side to receive a glass panel 41 which may be held in place with the aid of a frame 42. An electric light 43 mounted within the housing casts a desired illumination through the panel and so furnishes a means by which the indicator may be read in the darkness. Rearwardly of the glass and in spaced relation thereto is a dial plate 44 which, in the form shown, is arc-shaped for Right and Left readings thereupon. A hand 45 forming a pointer is adapted to swing across the dial plate upon a stud 46 forming a pivotal center therefor. Associated with the pointer is a pinion 47 in meshing relation with a segmental rack 48 having a pivotal mounting as at 49 upon a pin which is carried by a bracket plate 50 upstanding from a body 51 in which is a bore forming a cylinder wherein is slidingly mounted a duplex piston 52, the opposite ends of which are chambered. A closure 53 is provided at each cylinder end adjacent which are ports 54 and 55 wherewith the conduits 23 and 24 are respectively connected.

From the central portion of the piston is extended laterally a pin 56 which passes through a horizontal slot 57 in the body of the cylinder 51. This pin also is extended through a slot 58 which is formed radially through the segmental rack plate 48. The outer end of the pin may be split to receive the lower end of a flat wire spring 59 whose upper end is rigidly held by a stud 50 which is carried by the bracket plate 50. The normal tendency of this spring is to return the segmental rack plate to the central position shown in Fig. 2, thereby restoring the pointer hand 45 to vertical position whenever conditions will permit. With movement of the piston 52 in either direction, in response to a suction or minus pressure, the hand is actuated correspondingly. During such movements the pin 56 slides within the horizontal slot 57, and communicates motion to the segmental rack plate 48 while sliding within the vertical slot 57 thereof.

From the preceding description the operation of the present apparatus will be quite obvious. It is to be noted specially, however, that actuation of the direction indicator takes place automatically with each movement of the steering post 12. At no time is the operator obliged to give attention to any manual control. With steering movements to the right or left, one or the other of the ports 19 and 21 is placed in communication with the port 20 whereby the pointer hand is moved at once in a corresponding direction. In its changed position it remains until the steering post is again brought to the normal straight-ahead position whereupon the suction force is discontinued, permitting the spring 19 to restore the pointer hand to vertical position.

The present apparatus may be constructed and installed at very small expense. In operation it requires no attention, and it may be depended upon to perform satisfactorily over a long period of service. In many of its details numerous changes may, of course, be made from the form or type herein set forth by way of illustration, but in respect of its essential features and principles of operation, as defined by the claims following, full protection is desired.

I claim:

1. In combination with a steering mechanism, a valve control a Geneva gear movement operatively connecting said steering mechanism and valve, whereby the valve is held in either of two positions without resistance to turning movement of the steering mechanism, an indicating mechanism, and a fluid pressure source having connection with both said valve control and said indicating mechanism adapted to actuate the latter when the former is moved in response to operation of the steering mechanism, substantially as described.

2. In combination with a steering mechanism, a Geneva movement operatively connected thereto, a valve control operatively associated therewith and adapted to be moved and held in moved position thereby without resistance to turning movement of the steering mechanism, an indicator having an associated cylinder mechanism for imparting movements thereto, and connections from a fluid pressure source to the valve control and cylinder mechanism adapted to actuate the latter when the control is moved in response to operation of the steering mechanism, substantially as described.

3. A pressure actuated indicating mechanism in which is comprised a cylinder having a laterally extended pin, a segmental rack formed with a slot through which the pin is extended and adapted to be oscillated thereby, and a swinging pointer having an associated pinion co-acting with the segmental rack and adapted to be oscillated thereby, substantially as described.

4. A pressure actuated indicating mechanism in which is comprised a cylinder having a laterally extended pin, a segmental rack formed with a slot through which the pin is extended and adapted to be oscillated thereby, a swinging pointer having an associated pinion co-acting with the segmental rack and adapted to be oscillated thereby, and spring means associated with the pointer adapted to restore the same to a normal position, substantially as described.

5. In combination with a steering mechanism, a Geneva movement comprising a rotatable collar having a notch at one point in its periphery, a finger co-acting with the collar and notch and adapted to be swung from a normal position and held either to the right or left thereof with movement of the collar, a valve associated with the finger and adapted to be operated with movements thereof, cylinder mechanism with which is associated a pointer, and connections extended from a fluid pressure source through the valve to the cylinder mechanism adapted to actuate the latter when the valve is moved in response to swinging of the finger, substantially as described.

FRED F. SCHRODER.